(12) United States Patent
He (10) Patent No.: US 10,716,996 B2
(45) Date of Patent: *Jul. 21, 2020

(54) INFORMATION PROCESSING METHOD AND APPARATUS, ELECTRONIC DEVICE, AND STORAGE MEDIUM

(71) Applicant: NETEASE (HANGZHOU) NETWORK CO., LTD, Zhejiang (CN)

(72) Inventor: Zhaoda He, Zhejiang (CN)

(73) Assignee: NETEASE (HANGZHOU) NETWORK CO., LTD., Zhejiang (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/106,042

(22) Filed: Aug. 21, 2018

(65) Prior Publication Data

US 2019/0070493 A1     Mar. 7, 2019

(30) Foreign Application Priority Data

Sep. 1, 2017   (CN) .......................... 2017 1 0780056

(51) Int. Cl.
*A63F 13/00* (2014.01)
*A63F 13/2145* (2014.01)
(Continued)

(52) U.S. Cl.
CPC .......... *A63F 13/2145* (2014.09); *A63F 13/42* (2014.09); *A63F 13/537* (2014.09);
(Continued)

(58) Field of Classification Search
None
See application file for complete search history.

(56) References Cited

U.S. PATENT DOCUMENTS

2006/0132455 A1   6/2006  Rimas-Ribikauskas et al.
2007/0238529 A1*  10/2007  Iwamoto .............. H04W 4/60
                                              463/42
(Continued)

FOREIGN PATENT DOCUMENTS

CN    101172202 A    5/2008
CN    101527745 A    9/2009
(Continued)

OTHER PUBLICATIONS

Search report of CN Priority application No. 201710780056.7 filed on Sep. 1, 2017, dated Jun. 23, 2018.

*Primary Examiner* — Paul A D'Agostino
(74) *Attorney, Agent, or Firm* — Gang Yu (57) ABSTRACT

An information processing method and apparatus, an electronic device, and a storage medium are provided. The method includes: a first touch area is provided on the graphical user interface, and the virtual character is configured to move in the game scene according to a first touch operation received in the first touch area; when a second touch operation is detected, of which a starting touch point is in at least one signal icon, a position of a current touch point of the second touch operation is detected in real time; when the current touch point satisfies a preset condition, a mini-map is zoomed in on the graphical user interface; and when the end of the second touch operation is detected, and a position of an ending touch point of the second touch operation is in the mini-map, a prompt signal corresponding to the at least one signal icon is sent, the prompt signal including position indication information of the game scene.

20 Claims, 3 Drawing Sheets

(51) Int. Cl.
*G06F 3/0484* (2013.01)
*G06F 3/0481* (2013.01)
*A63F 13/42* (2014.01)
*A63F 13/537* (2014.01)
*G06F 3/0488* (2013.01)

(52) U.S. Cl.
CPC ...... *G06F 3/04815* (2013.01); *G06F 3/04845* (2013.01); *G06F 3/04886* (2013.01); *G06F 2203/04806* (2013.01)

(56) References Cited

U.S. PATENT DOCUMENTS

| | | | | |
|---|---|---|---|---|
| 2011/0256912 | A1* | 10/2011 | Baynes | A63F 13/803 463/6 |
| 2013/0127980 | A1* | 5/2013 | Haddick | G06F 3/013 348/14.08 |
| 2014/0191977 | A1* | 7/2014 | Feng | G06F 3/018 345/173 |
| 2014/0243089 | A1* | 8/2014 | Tsukioka | A63F 13/12 463/31 |
| 2014/0245367 | A1* | 8/2014 | Sasaki | H04N 21/4402 725/109 |
| 2016/0059131 | A1* | 3/2016 | Ye | A63F 13/537 463/31 |

FOREIGN PATENT DOCUMENTS

| | | |
|---|---|---|
| CN | 105094345 A | 11/2015 |
| CN | 105094346 A | 11/2015 |
| CN | 105159579 A | 12/2015 |
| CN | 106325668 A | 1/2017 |
| CN | 106453638 A | 2/2017 |
| CN | 106975219 A | 7/2017 |
| CN | 107008003 A | 8/2017 |

* cited by examiner

INFORMATION PROCESSING METHOD AND APPARATUS, ELECTRONIC DEVICE, AND STORAGE MEDIUM

CROSS-REFERENCE TO RELATED APPLICATIONS

The present disclosure claims priority of Chinese Patent Application No. 201710780056.7, filed on Sep. 1, 2017 and named after "Information Processing Method and Apparatus, Electronic Device, and Storage Medium". Contents of the present disclosure are hereby incorporated by reference in entirety of the Chinese Patent Application.

TECHNICAL FIELD

The present disclosure relates to the technical field of games, and in particular to an information processing method and apparatus, an electronic device, and a storage medium.

BACKGROUND

With development of intelligent mobile terminals and game industry, a lot of mobile games with different themes emerge to meet requirements of players. Multiple players in groups for battle in games may be a core gameplay for many mobile games. For example, the core gameplay for Multi-player Online Battle Arena (MOBA) mobile games is 5V5 group battle. In a process of players in groups for battle in the game, communication and cooperation among the players are crucial. Therefore, whether a convenient and rapid interaction mechanism can be provided for communication among the players or not is an important influencing factor on player experience in such type of mobile games.

SUMMARY

At least one embodiment of the present disclosure provides an information processing method and apparatus, an electronic device, and a storage medium.

In an embodiment of the present disclosure, an information processing method is provided. This method is applied to a mobile terminal having at least one processor for executing a software application and a touch screen which is rendered with a graphical user interface, contents rendered on the graphical user interface including a game scene, a virtual character, a mini-map, and at least one signal icon. The method includes that:

providing a first touch area on the graphical user interface, and configuring the virtual character to move in the game scene according to a first touch operation received in the first touch area;

when a second touch operation is detected, of which a starting touch point is in the at least one signal icon, detecting a position of a current touch point of the second touch operation in real time;

when the position of the current touch point satisfies a preset condition, zooming in the mini-map on the graphical user interface; and when the end of the second touch operation is detected, and a position of an ending touch point of the second touch operation is in the mini-map, sending a prompt signal corresponding to the at least one signal icon, the prompt signal including position indication information of the game scene.

In another embodiment of the present disclosure, an information processing apparatus is provided. This apparatus is applied to a mobile terminal having at least one processor for executing a software application and a touch screen which is rendered with a graphical user interface, contents rendered on the graphical user interface including a game scene, a virtual character, a mini-map, and at least one signal icon. The apparatus includes:

a first interaction component, configured to provide a first touch area on the graphical user interface, and configure the virtual character to move in the game scene according to a first touch operation received in the first touch area;

a first detection component, configured to detect, when a second touch operation is detected, of which a starting touch point is in the at least one signal icon, a position of a current touch point of the second touch operation in real time;

a second detection component, configured to zoom in, when the position of the current touch point satisfies a preset condition, the mini-map on the graphical user interface; and a third detection component, configured to send, when the end of the second touch operation is detected, and a position of an ending touch point of the second touch operation is detected in the mini-map, a prompt signal corresponding to the at least one signal icon, the prompt signal including position indication information of the game scene.

In another embodiment of the present disclosure, an electronic device is provided. The electronic device includes: at least one processor; and at least one memory, configured to store at least one executable instruction of the at least one processor, and the at least one processor is configured to execute the information processing method by executing the at least one executable instruction.

In another an embodiment of the present disclosure, at least one computer-readable storage medium is provided, on which at least one computer program may be stored, and the at least one computer program may be executed by at least one processor to implement the information processing method.

DETAILED DESCRIPTION

In order to make those skilled in the art better understand the solutions of the present disclosure, the technical solutions in the embodiments of the present disclosure will be described clearly and completely below with reference to the accompanying drawings in the embodiments of the present disclosure.

In the related art, a human-computer interaction design for players to send communication signals mainly includes the following modes.

At mode one, players send communication signals by inputting text. Since text input would interrupt a game operation, this mode is suitable for players in a non-battling state.

At mode two, a specific control is provided for players to send communication signals. For example, a gather signal sending button is provided for players to signal for a gather to allies. However, since players cannot auto-select a position where the signal is located, the players cannot show a definite gathering place to allies.

At mode three, by detecting a click operation of a player in a mini-map on a game interface, then a communication signal will be sent in a position of a game scene, wherein the position of the game scene is corresponding to a position in the mini-map. Although the player can autonomously select a position where the signal located in, the player cannot select the type of the signal (such as gather, attack and retreat), the type of the signal is preset as default by a system, and a selection result may be inconsistent with a real intention of the player. In addition, since a display space of a mobile phone is small, accurate position selection may not be performed in the mini-map, and mis-operation is easily caused. If a zoom-in button is clicked to zoom in the mini-map so as to improve the accuracy of the subsequent operation, the operation is incoherent, and the type of the signal cannot be selected likewise.

In an embodiment of the present disclosure, an information processing method is provided. It should be noted that the steps shown in the flowchart of the drawings may be performed in a computer system such as a set of computer-executable instructions, and although a logical order is shown in the flowchart, in some cases, the illustrated or described steps may be performed in an order other than the above.

Figure 1:
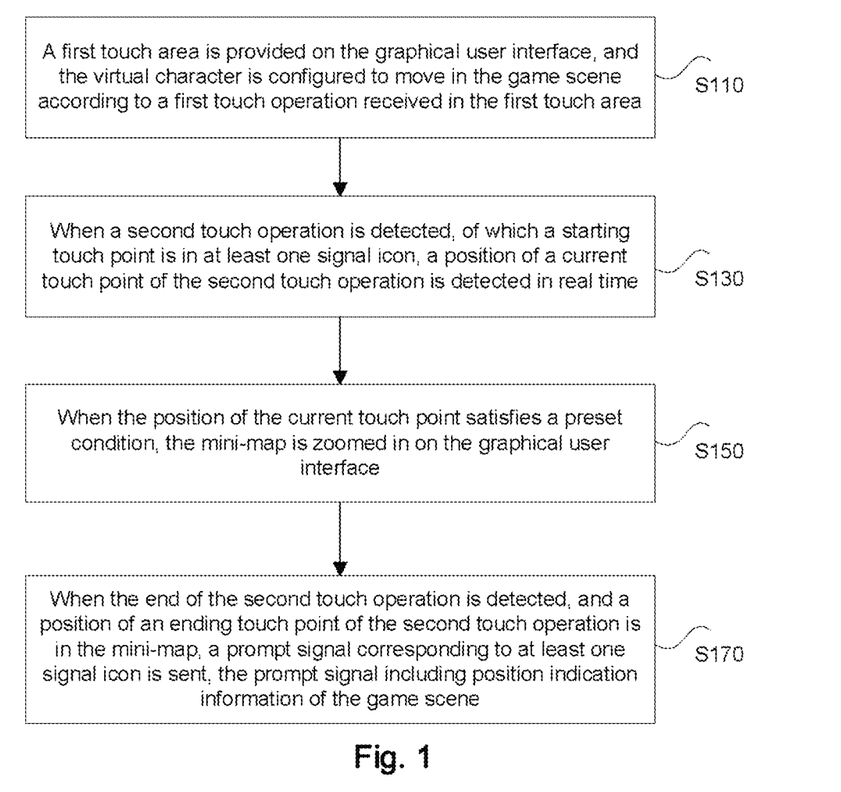
FIG. 1 is a flowchart of an information processing method according to an embodiment of the present disclosure.

FIG. 1 is a flowchart of an information processing method according to an embodiment of the present disclosure. This method is applied to a mobile terminal having at least one processor for executing a software application and a touch screen which is rendered with a graphical user interface, contents rendered on the graphical user interface including a game scene, a virtual character, a mini-map, and at least one signal icon. As shown in FIG. 1, the method may include the steps as follows.

At step S110, a first touch area is provided on the graphical user interface, and the virtual character is configured to move in the game scene according to a first touch operation received in the first touch area.

At step S130, when a second touch operation is detected, of which a starting touch point is in at least one signal icon, a position of a current touch point of the second touch operation is detected in real time.

At step S150, when the position of the current touch point satisfies a preset condition, the mini-map is zoomed in on the graphical user interface.

At step S170, when the end of the second touch operation is detected, and a position of an ending touch point of the second touch operation is in the mini-map, a prompt signal corresponding to at least one signal icon is sent, the prompt signal including position indication information of the game scene.

With the information processing method in the present exemplary embodiment, on the one hand, position information could be sent without manually inputting any related position information by a player; on the other hand, it is unnecessary for the player to click a zoom-in button of a mini-map, so that the operation is coherent and convenient, and the type and the position of the signal could be selected by the player. The information processing method provided in the present exemplary embodiment solves the technical problems that a signal position cannot be conveniently specified and the triggering operation is incoherent and inconvenient in sending prompt signal in a mobile game.

In the following, the steps of the information processing method in the present exemplary embodiment will be further described.

In the present exemplary embodiment, a software application is executed on at least one processor of a mobile terminal, and a graphical user interface is rendered on a touch screen of the mobile terminal, contents rendered on the graphical user interface including a game scene, a virtual character, a mini-map, and at least one signal icon.

Figure 2:
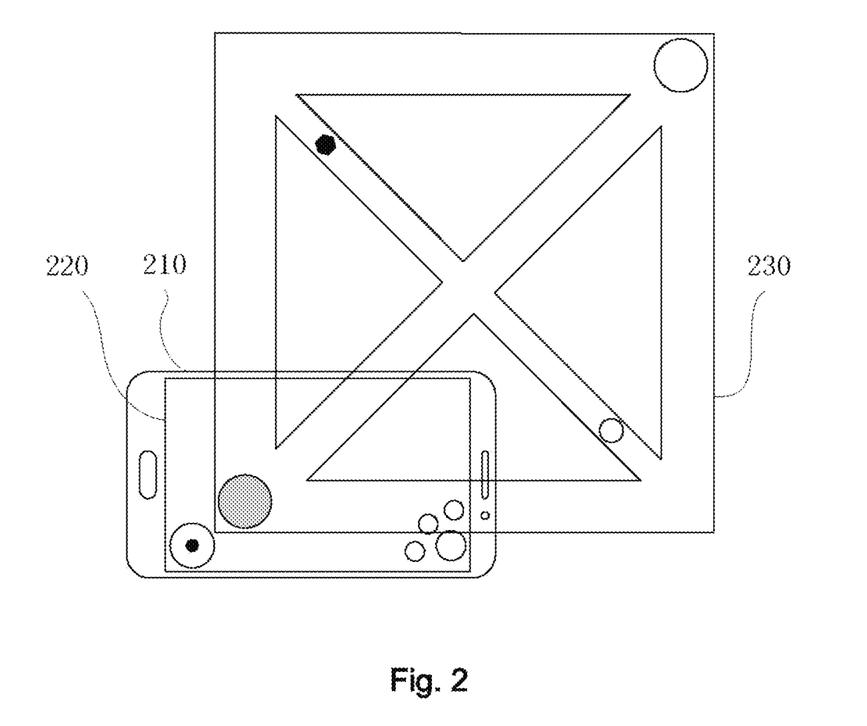
FIG. 2 is a schematic diagram of a game scene according to an embodiment of the present disclosure.

The contents rendered on the graphical user interface may include the entire part of the game scene, and may also be part of the game scene. For example, as shown in FIG. 2, since the game scene 230 is relatively large, local content of the game scene 230 is displayed on the graphical user interface 220 of the mobile terminal 210 during the game.

The mini-map may be a thumbnail of the entire game scene (e.g., 310 in FIG. 3), or may be a thumbnail of a local part of the game scene. Different details may be displayed on the mini-map for different types of games (e.g., details of maps that can be used for assisting a player in determining a position of the virtual character controlled by the player in the game world, real-time positions of ally characters, real-time positions of enemy characters, current vision information of the game scene, etc.). The mini-map may be displayed at the upper left, upper right, or other positions of the graphical user interface. The present exemplary embodiment is not limited to the displayed position of the mini-map.

Figure 3:
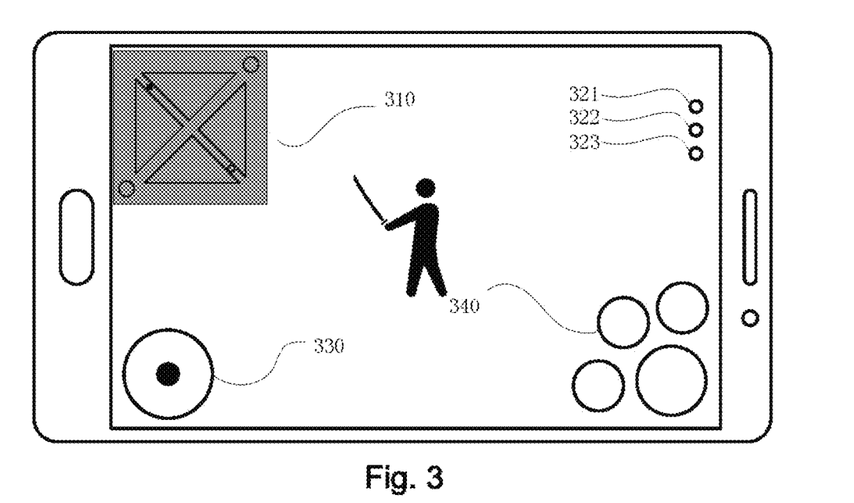
FIG. 3 is a schematic diagram of a graphical user interface of a mobile terminal according to an embodiment of the present disclosure.

The graphical user interface includes at least one signal icon (e.g., signal icons 321, 322, 323 in FIG. 3). The at least one signal icon may be located at the upper left, upper right, or other positions of the graphical interface. The at least one signal icon may also be located on the same or different sides of the graphical user interface. The present exemplary embodiment is not limited to the displayed position of the at least one signal icon.

At step S110, a first touch area is provided on the graphical user interface, and the virtual character is configured to move in the game scene according to a first touch operation received in the first touch area.

The first touch area is provided on the graphical user interface, and the virtual character is configured to move in the game scene according to the first touch operation received in the first touch area.

The first touch area may be a visible area on the graphical user interface, or may be an invisible area. In the first touch control area, an operation area such as a virtual joystick or a direction control virtual button may be displayed, which is not limited in this exemplary embodiment.

As an optional embodiment, the first touch area is the visible area. For example, the touch area may have a bounding box, or the touch area may rendered with a color, or the touch area may rendered with predetermined transparency, or adopt other modes to distinguish the touch area visually. The virtual character is controlled to perform at least one of movement and turning around in the game scene according to a touch operation such as sliding and clicking received in the touch area. A visual area can be positioned quickly by player, and the operation difficulty for a game novice would be reduced.

As another optional embodiment, the first touch area may be set as the invisible area on the graphical user interface. Thus, the first touch area may not cover or affect the game screen, and it can save the screen space and provide a better view for players. However, since the touch area may be set as invisible, and it is hard to be sensed by a player. As an optional implementation solution, a visual guide control may be displayed in the touch area. For example, in an embodiment of the present disclosure, when a virtual joystick is used as a direction controlling solution of a virtual character, the virtual joystick may be displayed in the touch area to visually guide the player.

In an alternative embodiment, the first touch area may also be a virtual cross button area or a virtual D-PAD area. The virtual character is controlled to perform at least one of movement and turning around in the game scene according to a first touch operation received in the virtual cross button area.

In an alternative embodiment, the first touch area is a virtual joystick control area. The virtual character is controlled to perform at least one of movement and turning around in the game scene according to a first touch operation received in the virtual joystick control area.

For example, as shown in FIG. 3, the first touch area is a virtual joystick control area. The virtual joystick control area is located at the lower left of the graphical user interface. A virtual joystick 330 is displayed in this area. The virtual character is controlled to move in the game scene according to a first touch operation received in the virtual joystick control area. Multiple skill icons 340 are provided at the lower right of the graphical user interface for providing the player with a control function of sending skills. Thus, in an alternative embodiment, the virtual character may be controlled to move in the game scene by the left hand of the player, and controlled to cast skills by the right hand. The skills indicated by the skill icons 340 may be an attack skill (e.g., a skill that is capable of reducing a Health Points (HP) value of at least one of enemy characters), a regeneration skill (for example, a skill that is capable of increasing a HP value of at least one of ally characters), and a freezing skill (for example, a skill that is capable of stopping or slowing down actions of the enemy character). In addition, skills corresponding to the skill icons 340 may be a targeting skill, and may also be a non-targeting skill (namely released by a click). After the skill icons 340 is touched, a virtual joystick for controlling a skill position or direction may be generated in the center of the skill icons 340, or at the position of a starting touch point of the touch operation. The player may control the virtual joystick by sliding to set the skill position or direction, and release the skill when the player finishes touching.

At step S130, when a second touch operation is detected, of which a starting touch point is in at least one signal icon, a position of a current touch point of the second touch operation is detected in real time.

In the present embodiment, when the starting touch point of the second touch operation is located in at least one signal icon, the position of the current touch point of the second touch operation is detected in real time.

For example, when detecting a sliding touch operation in the signal icon by a finger of a player, the position of the current touch point of the sliding touch operation is detected in real time.

In an alternative embodiment, when a second touch operation of which a touch point passes through the signal icon is detected, a position of a current touch point of the second touch operation is detected in real time. That is, a starting point of the second touch operation may not be located in the signal icon. Specifically, the starting touch point may be outside of the signal icon, and a current touch point is located in the signal icon during the second touch operation.

At step S150, when the position of the current touch point satisfies a preset condition, the mini-map is zoomed in on the graphical user interface.

It may be determined that whether the position of the current touch point satisfies a preset condition, if yes, the mini-map is zoomed in. Accordingly, it is avoided that such operation of zooming in the mini-map is not in accordance with an intention of a player. The preset condition may include one of the following: the position of the current touch point is in an activation response area; a distance between the position of the current touch point and the mini-map is shorter than or equal to a preset distance; the distance between the current touch point and the signal icon is longer than a preset distance; and other preset conditions.

In the present embodiment, the preset condition includes: the position of the current touch point is in the activation response area. That is, when the position of the current touch point is detected locating in the activation response area, the mini-map is zoomed in.

For example, as shown in FIG. 4(a), an activation response area 420 is provided on the graphical user interface, and a mini-map 310 is located in the activation response area 420. The activation response area 420 may be visible or invisible. In an alternative embodiment, the activation response area 420 is invisible, so that the screen space can be fully utilized without coverage. When a touch operation is detected, of which a starting touch point is in signal icon 321, a position of a current touch point 410 of the touch operation is detected in real time. As shown in FIG. 4(b), when the position of the current touch point 410 is located in the activation response area 420, the mini-map 310 is zoomed in to a preset size.

Figure 4:
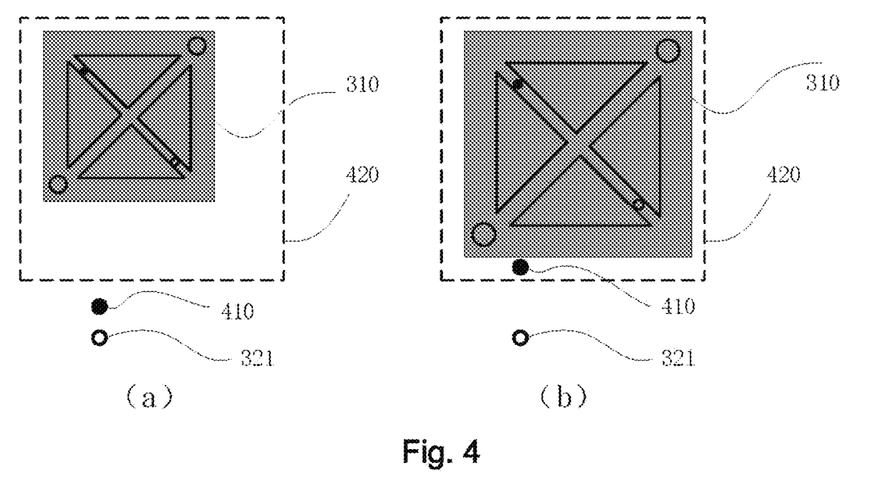
FIG. 4 is a schematic diagram of zooming in a mini-map according to an embodiment of the present disclosure.

It is to be noted that the contour shape and size of the activation response area 420 and a relationship between the activation response area 420 and the mini-map 310 are not limited to the case in the present embodiment, and there may be other cases. The shape of the activation response area 420 may be square, circular, or any other shape (including irregular polygons). The activation response area 420 may coincide with the mini-map 310. That is, when the current touch point 410 moves in the mini-map 310, the mini-map 310 is zoomed in. The position of the activation response area 420 may not cover the mini-map 310 entirely, or may partially cover the mini-map 310 or not cover the mini-map 310.

In an alternative embodiment, the preset condition includes: the distance between the position of the current touch point and the mini-map is shorter than or equal to the preset distance. That is, when the distance between the position of the current touch point and the mini-map is shorter than or equal to the preset distance, the mini-map is zoomed in.

For example, the distance between the position of the current touch point and a preset point in the mini-map (such as a center point) is detected, and when the distance between the position of the current touch point and the center point of the mini-map is shorter than or equal to the preset distance, the mini-map zoomed in.

In an alternative embodiment, a distance between the current touch point 410 and the signal icon 321 may be adopted as a preset condition for controlling the mini-map to be zoomed in. For example, when the distance between the positions of the current touch point 410 and the signal icon 321 is longer than a preset value, the mini-map 310 is zoomed in.

In an alternative embodiment, the mini-map may also be zoomed in when a second touch operation acting on the signal icon is detected.

At step S170, when the end of the second touch operation is detected, and a position of an ending touch point of the second touch operation is in the mini-map, a prompt signal corresponding to at least one signal icon is sent, the prompt signal including position indication information of the game scene.

For example, a current touch point of a touch operation (e.g., a sliding touch operation) is located in the mini-map. If a touch medium (e.g., a finger or a touch pencil) leaves a touch screen at this time, the current touch point is an ending touch point of the second touch operation. In this way, the position of the ending touch point of the second touch operation is detected in the mini-map, and a prompt signal (e.g., attack, retreat, etc.) corresponding to the at least one signal icon is sent, the prompt signal including position indication information of the game scene.

The function of the prompt signal is used for prompting other players (e.g., allies in a team game) in the game. Therefore, the prompt signal may be sent to allies through a game server, so that a corresponding signal is displayed on the game graphical user interface of a teammate's device. Of course, corresponding signals may also be displayed on the game graphical user interfaces of all allies' or all players' devices.

Figure 5:
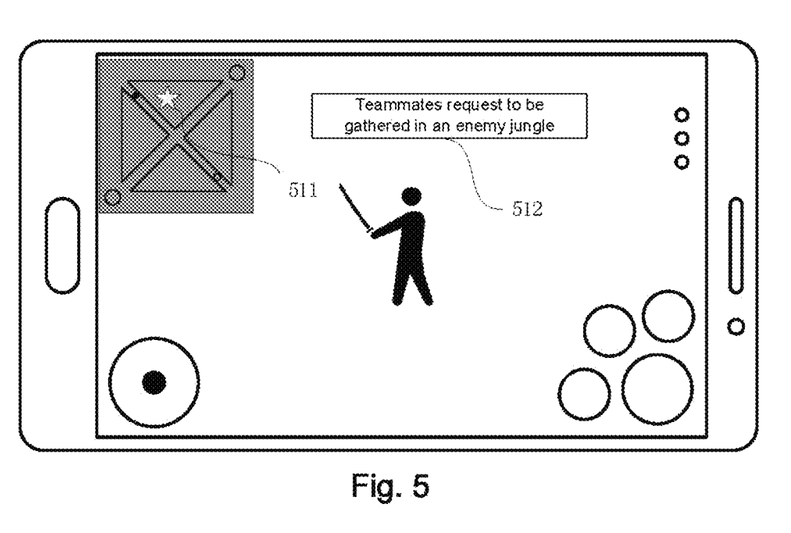
FIG. 5 is a schematic diagram of displaying a prompt signal according to an embodiment of the present disclosure.

In an alternative embodiment, after sending the corresponding prompt signal, the position of the game scene indicated by the position indication information of the game scene is identified on the mini-map, as position 511 showed in FIG. 5.

In an alternative embodiment, when a prompt signal sent by other terminals is received, the position of the game scene indicated by the position indication information of the game scene is identified on the mini-map, as position 511 showed in 511 in FIG. 5.

One of the technical problems to be solved by the present disclosure is to provide an interaction mechanism that the player can send position information without manually inputting position information. A prompt signal includes position indication information of the game scene, on the one hand, the position information can be sent without requiring the player to manually input the position, on the other hand, it is unnecessary for the player to click a zoom-in button of the mini-map, the operation is more consistent and convenient, and the type of the signal can be selected. In an alternative embodiment, a player terminal receives the prompt signal, and identifies a position on the mini-map according to the position indication, so that the player can intuitively see the position indicated by the prompt signal on a panoramic thumbnail of the game scene. The prompt signal may be shown as a dynamic special effect, such as a flashing highlighting prompt. As another alternative embodiment, a terminal sends the prompt signal, and identifies the position indicated by the prompt signal on the mini-map, so that the player can obtain good operational feedback.

In addition to the position indication information, the prompt signal may also include voice prompt information and text prompt information, or a reminding voice and a reminding text (e.g., 512 in FIG. 5). For example, a reminding voice (e.g., when a player selects "gather", audio information "gather" of voice reminding is sent to the terminals of other players) may be sent to terminals of other players, and voice reminding indication information may also be sent to the terminals of other players to instruct the terminals of other players to play the corresponding and pre-stored voice audio.

In an alternative embodiment, the position indication information of the game scene includes position information in the game scene corresponding to the position of the ending touch point of the second touch operation.

For example, a position of an ending touch point of the second touch operation in a mini-map is a point A. According to a corresponding relationship between the mini-map and a game scene, a position point B in the game scene may be determined. Position indication information of the game scene includes position indication information of the point B (it should be noted that the position indication information of the point B may be the coordinates of the point B in the game scene, or the coordinates of the point A corresponding to the point B on the mini-map, or other position indication information capable of directly or indirectly indicating the position of the point B). Or, a position of an ending touch point of a finger of a player within a range of a mini-map is a point A. According to a corresponding relationship between the mini-map and a game scene, a position point B in the game scene may be determined, the point B is located in a specific area C (e.g., a jungle C) in the game scene, and the position indication information of the game scene includes the position indication information of the specific area C.

In an alternative embodiment, after sending the corresponding prompt signal, the mini-map is restored.

In another embodiment of the present disclosure, an information processing apparatus is also provided. This apparatus is applied to a mobile terminal having at least one processor for executing a software application and a touch screen which is rendered with a graphical user interface, contents rendered on the graphical user interface including a game scene, a virtual character, a mini-map, and at least one signal icon. The apparatus includes:

a first interaction component, configured to provide a first touch area on the graphical user interface, and configure the virtual character to move in the game scene according to a first touch operation received in the first touch area;

a first detection component, configured to detect, when a second touch operation is detected, of which a starting touch point is in the at least one signal icon, a position of a current touch point of the second touch operation in real time;

a second detection component, configured to zoom in, when the position of the current touch point satisfies a preset condition, the mini-map on the graphical user interface; and a third detection component, configured to send, when the end of the second touch operation is detected, and a position of an ending touch point of the second touch operation is detected in the mini-map, a prompt signal corresponding to the at least one signal icon, the prompt signal comprising position indication information of the game scene.

In another embodiment of the present disclosure, an electronic device is also provided. The electronic device includes: a processing component, which may further include at least one processor, and a memory resource represented by at least one memory and configured to store at least one instruction executable by the processing component, such as at least one application program. The at least one application program stored in the at least one memory may include at least one component each corresponding to a set of instructions. In addition, the processing component is configured to execute instructions to perform the above-described information processing method.

The electronic device may also include: a power supply component, configured to perform power management on the executed electronic device; a wired or wireless network interface, configured to connect the electronic device to a network; and an input output (I/O) interface. The electronic device may operate based on an operating system stored in a memory, such as Android, iOS, Windows, Mac OS X, Unix, Linux, FreeBSD, or the like.

In another embodiment of the present disclosure, a computer-readable storage medium is also provided. A program product capable of implementing the above method of the present specification is stored thereon. In some possible implementation manners, various aspects of the present disclosure may also be implemented in the form of a program product, which includes at least one program code for causing a terminal device to execute the steps according to various exemplary implementation manners of the present disclosure described in the "Exemplary Method" section of the present specification when the program product runs on a terminal device. It may use a portable Compact Disc Read-Only Memory (CD-ROM) and include a program code, and may run on a terminal device such as a personal computer. However, the program product of the present disclosure is not limited thereto, and in this document, the readable storage medium may be any tangible medium that contains or stores a program. The program may be used by or in conjunction with an instruction execution system, device, or apparatus.

The program product may employ any combination of at least one readable media. The readable medium may be a readable signal medium or a readable storage medium. The readable storage medium may be, for example but not limited to, an electrical, magnetic, optical, electromagnetic, infrared, or semiconductor system, apparatus, or device, or any combination of the above. More specific examples (non-exhaustive listings) of the readable storage medium include: electrical connectors with one or more wires, portable disks, hard disks, Random Access Memories (RAMs), ROMs, Erasable Programmable Read-Only Memories (EPROMs or flash memories), optical fibers, portable CD-ROMs, optical storage devices, magnetic storage devices, or any suitable combination of the above.

The sequence numbers of the foregoing embodiments of the present disclosure are merely for description and do not represent the advantages and disadvantages of the embodiments.

In the foregoing embodiments of the present disclosure, the description of each embodiment has its own emphasis. For the part not described in detail in one embodiment, reference may be made to the relevant description of other embodiments.

Apparently, the described embodiments are a part of the embodiments of the present disclosure, not all of the embodiments. On the basis of the embodiments of the present disclosure, all other embodiments obtained on the premise of no creative work of those skilled in the art fall within the protection scope of the present disclosure.

It should be noted that the specification and claims of the present disclosure and terms "first", "second", etc. in the foregoing drawings are used for distinguishing similar objects rather than describing a specific sequence or a precedence order. It will be appreciated that the terms used in such a way may be exchanged under appropriate conditions, in order that the embodiments of the present disclosure described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or elements to clearly list those steps or elements, and other steps or elements which are not clearly listed or are inherent to these processes, methods, products or devices may be included instead.

In some embodiments provided by the present disclosure, it shall be understood that the disclosed technical content may be implemented in other modes. For example, the apparatus embodiment described above is schematic. For example, the division of the components or elements is the division of logical functions, and there may be additional division modes during practical implementation. For example, a plurality of elements or assemblies may be combined or integrated to another system, or some characteristics may be omitted or may be not executed; and in addition, displayed or discussed mutual coupling or direct coupling or communication connection may be performed via some interfaces, and indirect coupling or communication connection between apparatuses or elements may be in an electrical form, a mechanical form or other forms.

The elements illustrated as separate components may be or may not be physically separated. Components for element display may be or may not be physical elements. That is, the components may be located at a place or may be distributed on a plurality of network elements. The aims of the solutions of the embodiments may be achieved by selecting some or all elements according to actual requirements.

In addition, all function elements in all embodiments of the present disclosure may be integrated in a processing element, or each element may exist separately and physically, or two or more elements may be integrated in an element. The integrated element may be implemented in a hardware form or may be implemented in a software function element form.

If the integrated element is implemented in the form of a software function element and is sold or used as an independent product, the product may be stored in a computer-readable storage medium. Based on this understanding, the technical solutions of the present disclosure may be substantially embodied in the form of a software product or parts contributing to the traditional art or all or some of the technical solutions may be embodied in the form of a software product, and a computer software product is stored in a storage medium, including a plurality of instructions enabling a computer device (which may be a personal computer, a server or a network device) to execute all or some of the steps of the method according to each embodiment of the present disclosure.

The above are exemplary implementation manners of the present disclosure, and it should be pointed out that those of ordinary skill in the art can also make several improvements and modifications without departing from the principle of the present disclosure. These improvements and modifications should also be regarded as the scope of protection of the present disclosure.

What is claimed is:

1. An information processing method, applied to a mobile terminal having at least one processor for executing a software application and a touch screen which is rendered with a graphical user interface, contents rendered on the graphical user interface comprising a game scene, a virtual character, a mini-map, and at least one signal icon, the method comprising:
   providing a first touch area on the graphical user interface, and configuring the virtual character to move in the game scene according to a first touch operation received in the first touch area;

when a second touch operation is detected, of which a starting touch point is in the at least one signal icon, detecting a position of a current touch point of the second touch operation in real time;

when the position of the current touch point satisfies a preset condition, zooming in the mini-map on the graphical user interface; and when the end of the second touch operation is detected, and a position of an ending touch point of the second touch operation is in the mini-map, sending a prompt signal corresponding to the at least one signal icon, the prompt signal comprising position indication information of the game scene.

2. The information processing method as claimed in claim 1, further comprising:

after sending the prompt signal, identifying a position of the game scene indicated by the position indication information of the game scene on the mini-map.

3. The information processing method as claimed in claim 1, further comprising:

when the prompt signal sent by other terminals is received, identifying a position of the game scene indicated by the position indication information of the game scene on the mini-map.

4. The information processing method as claimed in claim 1, further comprising:

after sending the prompt signal, restoring the mini-map.

5. The information processing method as claimed in claim 1, wherein the prompt signal further comprises at least one of: voice prompt information and text prompt information.

6. The method as claimed in claim 1, wherein the first touch area is a virtual joystick control area.

7. The information processing method as claimed in claim 1, wherein the position indication information of the game scene comprises position information in the game scene corresponding to the position of the ending touch point of the second touch operation.

8. An information processing apparatus, applied to a mobile terminal having at least one processor for executing a software application and a touch screen which is rendered with a graphical user interface, contents rendered on the graphical user interface comprising a game scene, a virtual character, a mini-map, and at least one signal icon, the apparatus comprising:

a first interaction component, configured to provide a first touch area on the graphical user interface, and configure the virtual character to move in the game scene according to a first touch operation received in the first touch area;

a first detection component, configured to detect, when a second touch operation is detected, of which a starting touch point is in the at least one signal icon, a position of a current touch point of the second touch operation in real time;

a second detection component, configured to zoom in, when the position of the current touch point satisfies a preset condition, the mini-map on the graphical user interface; and a third detection component, configured to send, when the end of the second touch operation is detected, and a position of an ending touch point of the second touch operation is detected in the mini-map, a prompt signal corresponding to the at least one signal icon, the prompt signal comprising position indication information of the game scene.

9. A computer-readable storage medium, on which at least one computer program is stored, wherein the at least one computer program is executed by at least one processor to implement the information processing method as claimed in claim 1.

10. An electronic device, comprising:

at least one processor; and at least one memory, configured to store at least one executable instruction of the at least one processor, wherein the at least one processor is configured to execute the at least one executable instruction to perform the signal processing method as claimed in claim 1.

11. The information processing method as claimed in claim 1, wherein contents rendered on the graphical user interface comprises one of the following: an entire part of the game scene, and a local part of the game scene.

12. The method as claimed in claim 1, wherein the first touch area is a direction control virtual button.

13. The method as claimed in claim 1, wherein the first touch area is a visible area on the graphical user interface.

14. The method as claimed in claim 1, wherein the first touch area is an invisible area on the graphical user interface.

15. The method as claimed in claim 14, wherein when the first touch area is the invisible area on the graphical user interface, displaying a visual guide control in the first touch area.

16. The method as claimed in claim 1, wherein before zooming on the mini-map on the graphical user interface, the method further comprises:

zooming in the mini-map by judging whether the position of the current touch point of the second touch operation satisfies the preset condition.

17. The method as claimed in claim 16, wherein the preset condition comprises one of the following:

the position of the current touch point is in an activation response area;

a distance between the position of the current touch point and the mini-map is shorter than or equal to a preset distance; and a relative position between the position of the current touch point and the at least one signal icon.

18. The method as claimed in claim 17, further comprising:

when the position of the current touch point is detected in the activation response area, zooming in the mini-map to a preset size.

19. The method as claimed in claim 17, further comprising:

when the distance between the position of the current touch point and the mini-map is shorter than or equal to the preset distance, zooming in the mini-map.

20. The method as claimed in claim 17, further comprising:

when the distance between the position of the current touch point and the at least one signal icon is longer than the preset distance, zooming in the mini-map.

* * * * *